US009614892B2

(12) United States Patent
Bidarkar et al.

(10) Patent No.: US 9,614,892 B2
(45) Date of Patent: Apr. 4, 2017

(54) METHOD AND SYSTEM FOR MEASURING DISPLAY PERFORMANCE OF A REMOTE APPLICATION

(71) Applicants: Rishi Bidarkar, San Jose, CA (US); Banit Agrawal, Sunnyvale, CA (US); Lawrence Andrew Spracklen, Boulder Creek, CA (US); Hari Sivaraman, Livermore, CA (US)

(72) Inventors: Rishi Bidarkar, San Jose, CA (US); Banit Agrawal, Sunnyvale, CA (US); Lawrence Andrew Spracklen, Boulder Creek, CA (US); Hari Sivaraman, Livermore, CA (US)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 14/558,313

(22) Filed: Dec. 2, 2014

(65) Prior Publication Data

US 2015/0084979 A1 Mar. 26, 2015

Related U.S. Application Data

(63) Continuation of application No. 13/432,331, filed on Mar. 28, 2012, now Pat. No. 8,902,248.

(Continued)

(51) Int. Cl.
*H04L 9/08* (2006.01)
*G06F 3/14* (2006.01)
(Continued)

(52) U.S. Cl.
CPC .............. *H04L 67/025* (2013.01); *G06F 3/14* (2013.01); *G06F 17/246* (2013.01); *G09G 5/02* (2013.01);
(Continued)

(58) Field of Classification Search
CPC .. G09G 5/34; G09G 2340/02; G09G 2340/04; G09G 2340/0428; G09G 2350/00; G09G 2360/08; G09G 2330/12
See application file for complete search history.

(56) References Cited

U.S. PATENT DOCUMENTS 7,106,347 B1 9/2006 Rosenberg
7,233,336 B2 6/2007 Mondal
(Continued)

OTHER PUBLICATIONS

F. Lamberti and A. Sanna, "A Streaming-Based Solution for Remote Visualization of 3D Graphics on Mobile Devices," in IEEE Transactions on Visualization and Computer Graphics, vol. 13, No. 2, pp. 247-260, Mar.-Apr. 2007.*

*Primary Examiner* — Mark Zimmerman
*Assistant Examiner* — Nurun N Flora

(57) ABSTRACT

This disclosure describes a performance-monitoring system that computes a display performance metric of a remote application. During operation, the system performs a sequence of input events, and receives information which updates a graphical user interface (GUI). The GUI displays a sequence of frames rendered by a remote application in response to the input events. The system then samples colors at a number of pivot points on the GUI, and matches the a respective frame to a previously performed input event based on the sampled colors. The system subsequently computes a display performance metric for the remote application based on the frames and the corresponding input events.

16 Claims, 12 Drawing Sheets

Related U.S. Application Data

(60) Provisional application No. 61/507,939, filed on Jul. 14, 2011.

(51) Int. Cl.

| | | |
|---|---|---|
| *G06F 17/24* | (2006.01) | |
| *G09G 5/02* | (2006.01) | |
| *H04N 21/258* | (2011.01) | |
| *H04N 21/658* | (2011.01) | |
| *H04N 21/442* | (2011.01) | |
| *G09G 5/34* | (2006.01) | |
| *H04L 29/08* | (2006.01) | |

(52) U.S. Cl.
CPC ........... *G09G 5/34* (2013.01); *G09G 2330/12* (2013.01); *G09G 2340/02* (2013.01); *G09G 2340/04* (2013.01); *G09G 2340/0428* (2013.01); *G09G 2350/00* (2013.01); *G09G 2360/08* (2013.01); *G09G 2370/022* (2013.01); *H04N 21/25825* (2013.01); *H04N 21/25833* (2013.01); *H04N 21/4424* (2013.01); *H04N 21/6582* (2013.01)

(56) References Cited

U.S. PATENT DOCUMENTS

| | | | |
|---|---|---|---|
| 8,127,233 B2 | 2/2012 | McDowell | |
| 8,341,624 B1 | 12/2012 | Hobbs | |
| 8,396,122 B1 | 3/2013 | Taylor | |
| 8,453,148 B1* | 5/2013 | Hobbs | G06F 3/1454 718/102 |
| 8,489,704 B1 | 7/2013 | Mendez | |
| 8,743,954 B1 | 6/2014 | Masterson | |
| 8,774,536 B1 | 7/2014 | Jia | |
| 8,902,248 B1 | 12/2014 | Bidarkar et al. | |
| 8,972,893 B2 | 3/2015 | Duncan | |
| 9,235,313 B2 | 1/2016 | Wu | |
| 2003/0099411 A1 | 5/2003 | Kokemohr | |
| 2004/0098731 A1 | 5/2004 | Demsey | |
| 2004/0125110 A1 | 7/2004 | Kohda | |
| 2004/0205514 A1 | 10/2004 | Sommerer | |
| 2004/0255276 A1 | 12/2004 | Rovang | |
| 2005/0010861 A1 | 1/2005 | Augustyn | |
| 2005/0124389 A1 | 6/2005 | Yang | |
| 2006/0078051 A1 | 4/2006 | Liang et al. | |
| 2007/0009045 A1 | 1/2007 | Mohandas | |
| 2007/0022144 A1 | 1/2007 | Chen | |
| 2008/0155454 A1 | 6/2008 | Balasubramanian | |
| 2009/0037774 A1 | 2/2009 | Rideout et al. | |
| 2009/0128491 A1 | 5/2009 | Katayama | |
| 2009/0153585 A1 | 6/2009 | Mahajan | |
| 2009/0210817 A1 | 8/2009 | Schmieder | |
| 2009/0222739 A1 | 9/2009 | Schmieder | |
| 2009/0234940 A1 | 9/2009 | Pal et al. | |
| 2009/0319933 A1 | 12/2009 | Zaika | |
| 2010/0007788 A1 | 1/2010 | Lee et al. | |
| 2010/0020875 A1 | 1/2010 | Macq | |
| 2010/0064260 A1 | 3/2010 | Amano | |
| 2010/0161711 A1* | 6/2010 | Makhija | G06F 9/455 709/203 |
| 2010/0162338 A1 | 6/2010 | Makhija | |
| 2010/0290667 A1 | 11/2010 | Lienhart et al. | |
| 2011/0010629 A1 | 1/2011 | Castro | |
| 2011/0199389 A1 | 8/2011 | Lu | |
| 2011/0249572 A1 | 10/2011 | Singhal et al. | |
| 2011/0276900 A1 | 11/2011 | Khan | |
| 2012/0042252 A1 | 2/2012 | Neerudu | |
| 2012/0084774 A1 | 4/2012 | Post et al. | |
| 2012/0206387 A1* | 8/2012 | Omura | G06F 3/03545 345/173 |
| 2012/0307074 A1 | 12/2012 | Bhagavathy et al. | |
| 2013/0067331 A1 | 3/2013 | Glazer | |
| 2013/0097426 A1 | 4/2013 | Agrawal | |
| 2013/0132971 A1 | 5/2013 | Assuncao | |
| 2013/0156100 A1 | 6/2013 | Matsui | |
| 2013/0166629 A1 | 6/2013 | Ivashin | |
| 2013/0187916 A1 | 7/2013 | Toy | |
| 2013/0290856 A1 | 10/2013 | Beveridge | |
| 2014/0153457 A1 | 6/2014 | Liu | |
| 2014/0226901 A1 | 8/2014 | Spracklen | |
| 2014/0320673 A1 | 10/2014 | Agrawal | |
| 2015/0009222 A1 | 1/2015 | Diard | |
| 2015/0019694 A1 | 1/2015 | Feng | |
| 2015/0030084 A1 | 1/2015 | Marchya | |
| 2015/0043312 A1 | 2/2015 | Wu | |
| 2015/0046852 A1 | 2/2015 | Furtwangler | |
| 2015/0127716 A1 | 5/2015 | Agrawal et al. | |
| 2015/0180933 A1 | 6/2015 | Spracklen et al. | |
| 2015/0181207 A1 | 6/2015 | Agrawal et al. | |
| 2015/0186102 A1 | 7/2015 | Yamaguchi | |
| 2015/0194136 A1 | 7/2015 | Diard | |
| 2015/0312599 A1 | 10/2015 | Brockman | |
| 2016/0073113 A1 | 3/2016 | Rintaluoma | |

\* cited by examiner

| 500 | 505 | 510 | 515 | 520 | 525 | 530 | 535 |
|---|---|---|---|---|---|---|---|
| 540 | 545 | 550 | 555 | 560 | 565 | 570 | 575 |
| 580 | 585 | ... | | | | | |
| 620 | 626 | ... | | | | | |
| 660 | 665 | ... | | | | | |
| 700 | 705 | ... | | | | | |
| 740 | 745 | ... | | | | | |
| 780 | 785 | ... | | | | | |
| 820 | 825 | ... | | | | | |
| 860 | 865 | ... | | | | | |
| 900 | 905 | ... | | | | | |
| 940 | 945 | ... | | | | | |
| 980 | 985 | ... | | | | | |
| 1020 | 1025 | ... | | | | | |
| 1060 | 1060 | ... | | | | | |
| 1100 | 1105 | ... | | | | | |

METHOD AND SYSTEM FOR MEASURING DISPLAY PERFORMANCE OF A REMOTE APPLICATION

CLAIM OF PRIORITY

This application is a continuation of U.S. patent application Ser. No. 13/432,331 filed on Mar. 28, 2012 and entitled "METHOD AND SYSTEM FOR MEASURING DISPLAY PERFORMANCE OF A REMOTE APPLICATION", which claims priority to U.S. Provisional Application No. 61/507,939, entitled "3D and Interactive Workload Design and Measurement for Remote Applications," by inventors Rishi Bidarkar, Banit Agrawal, Lawrence Andrew Spracklen, and Hari Sivaraman, filed 14 Jul. 2011, the disclosure of each of which is incorporated by reference herein in its entirety.

BACKGROUND

Field

This disclosure is generally related to measuring the display performance of remotely executed applications. More specifically, this disclosure is related to performing and monitoring various workloads at a client device to measure the display performance of remote applications, such as a virtual desktop.

Related Art

The relentless growth of the Internet and ever-decreasing costs of bandwidth and computing power have created an unprecedented market for distributed computing. As a result, an increasing number of software applications are offered as services to end users over the network. These applications typically reside on a remote host, and the user interface is transmitted over the network and presented at a client device.

One such example is the virtual desktop infrastructure (VDI), which can include one or more servers that are used to host a virtualized desktop for a remote user. The virtual desktop servers may belong to a computer cluster or a data center, and are configured to provide a remote user interface to the user's client device over a network. The term "desktop" generally refers to a productivity environment, which typically receives mouse and keyboard inputs from the user and provides a graphical user interface (GUI) as an output. The user can use the mouse and keyboard to interact with software executing on a remote host system.

The virtual desktop is typically generated by an operating system, such as Microsoft Windows®, Linux, Mac OSX®, etc. The operating system and software applications can reside on a physical computer (e.g., a blade server in a data center), or within a virtual machine residing on a physical computer. A virtual desktop server includes software that captures the display output from the desktop, and optionally encodes the display output in a compressed format for transmission over a network to the user's client device.

However, the available bandwidth between a virtual desktop server (or a remote application in general) and a client device can vary due to, for example, network congestion. A virtual desktop server at one location may have a faster connection to the client device than another server at a different location. Further, the amount of required bandwidth for transmitting the desktop output can vary depending on the user's activity. Therefore, the user's experience is subject to the tasks being performed by the user. However, it is oftentimes difficult to determine whether a particular VDI configuration can adequately meet the needs of its users based on their intended activity.

SUMMARY

A performance-monitoring system is provided to compute a display performance metric of a remote application. During operation, the system performs a sequence of input events, and receives information which updates a graphical user interface (GUI). The GUI displays a sequence of frames rendered by a remote application in response to the input events. The system then samples colors at a number of pivot points on the GUI, and matches a respective frame to a previously performed input event based on the sampled colors. The system subsequently computes a display performance metric for the remote application based on the frames and the corresponding input events.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. The present invention is therefore not limited to the embodiments shown.

Overview

This disclosure describes a performance-monitoring system that solves the problem of measuring user experience of remote applications. In one embodiment, the performance-monitoring system can generate a sequence of input events to interact with a graphical user interface (GUI) rendered by a remote application, such as a virtual desktop server, and measure the corresponding responses in the display output at the user end. This system can be a stand-alone system or can reside with a client device.

When the system transmits an input event to the remote application (e.g., virtual desktop server), the system stores a timestamp for the input event. When the system receives information that updates the GUI from the virtual desktop server, the system measures a particular feature of each updated frame, and stores a timestamp for the frame. The system can compute a display performance metric for the virtual desktop server by comparing the time stamps of input events and their corresponding frames. For example, the system can compute a frame-yield metric that indicates a number of frames displayed at the client computer and/or a number of frames that were dropped. The system can also compute a total runtime for displayed frames corresponding to the sequence of input events, a smoothness metric, and/or a responsiveness metric.

Exemplary Computing Environment

Figure 1:
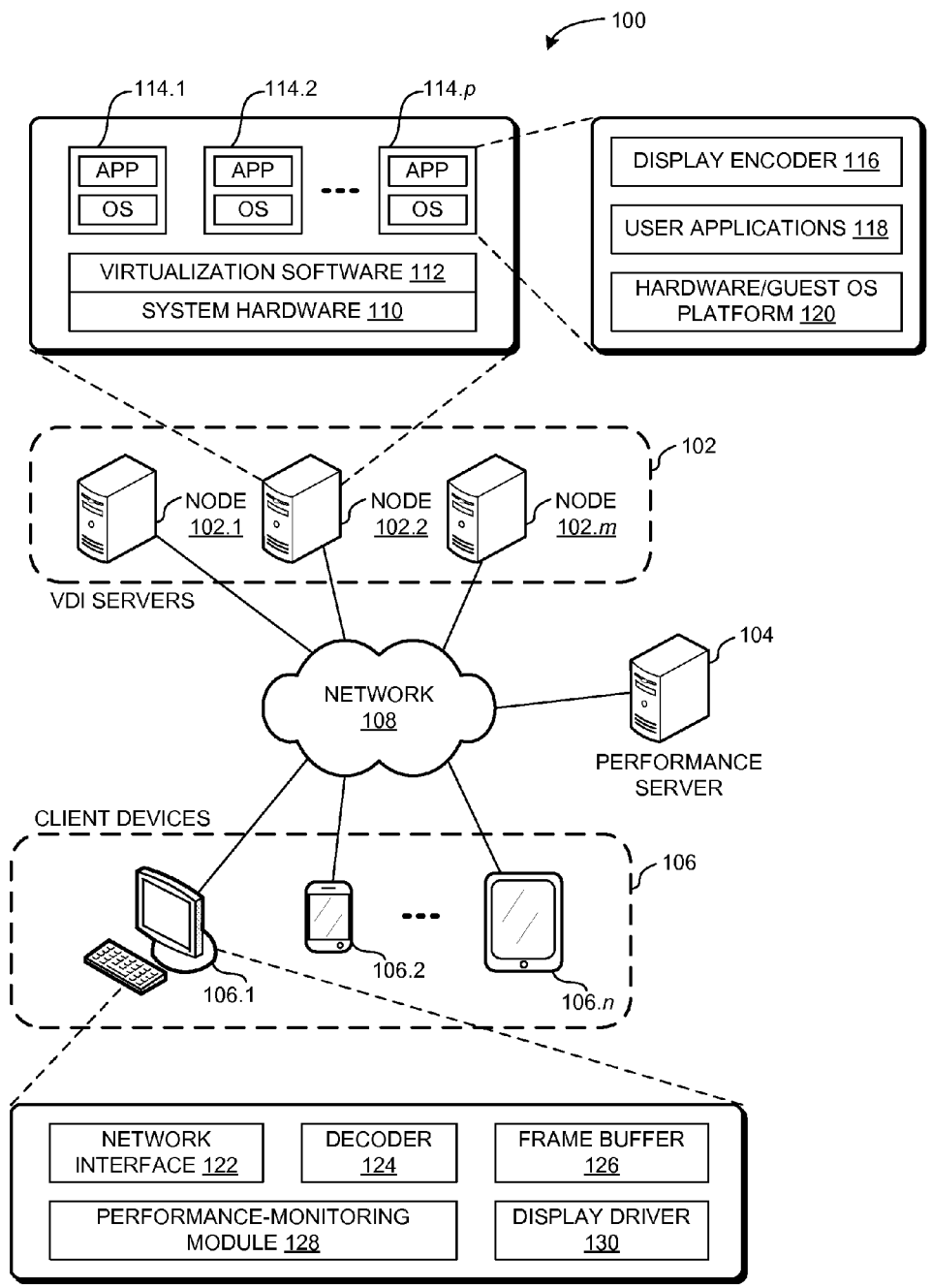
FIG. 1 illustrates an exemplary computing environment.

FIG. 1 illustrates an exemplary computing environment 100. Computing environment 100 can include virtual desktop infrastructure (VDI) servers 102 (including nodes 102.1, 102.2, . . . , and 102.m) that host virtual desktops over a computer network 108. Further, computing environment 100 can include client devices 106 (such as devices 106.1, 106.2, . . . , and 102.n) that access the virtual desktop hosted on VDI servers 102 via network 108.

VDI servers 102 can each include system hardware 110, virtualization software 112, and a plurality of virtual machines 114.1-114.p. Each virtual machine 114 is a software construct of an isolated physical computer system and relies on the physical resources of a server (e.g., system hardware 110) to execute guest system software. In some embodiments, the guest system software can include a guest operating system platform 120 and user applications 118 that execute within virtual machines 114.

Virtualization software 112 can allocate physical resources of the host system via device emulation software to each of the virtual machines 114.1-114.p, and isolates the memory spaces and executions of the virtual machines from one another. A virtual machine can include virtualized hardware such as virtual disk, virtual processors, virtual network interfaces and other virtual I/O devices such as mouse, screen, and keyboard interfaces.

In virtual machine 114.p, virtual hardware and guest OS platform 120 provide hardware and/or software resources to user applications 118 and a display encoder 116. Operating system 120 and user applications 118 generate graphical user interfaces (GUIs) that are transmitted to a client device 106. Display encoder 116 can reside within virtual machine 114.p or within virtualization software 112. Recall that virtualization software 112 emulates the devices that form virtual hardware for each of the virtual machines 114.1-114.p. Virtualization software 112 can intercept commands to a display driver and read data directly from the virtual display output buffer to obtain display information from the guest OS 120 and user applications 118.

Client devices can each include a network interface 122, a decoder 124, a frame buffer 126, a performance-monitoring module 128, and a display driver 130. Frame buffer 126 drives a video display from a memory buffer that contains a complete frame of data. Information stored in frame buffer 126 typically includes color values for every pixel displayed on the screen. A color value can be stored in any arbitrary format, such as various well-known formats, including a 1-bit monochrome format, a 4-bit palletized format, an 8-bit palletized format, a 16-bit high-color format, or a 24-bit true-color format.

In this example, virtual machine 114.p communicates with client device 106.1 over network 108 using a communication protocol such as the Remote Desktop Protocol (RDP). RDP is a multichannel-capable protocol that supports separate virtual channels for carrying presentation data, serial device communication, licensing information, highly encrypted data (keyboard, mouse activity), etc.

Network interface 122 receives encoded display information over network 108 from a VDI server 102.2. Further, network interface 122 sends the encoded display information to decoder 124, which populates frame buffer 126 with display output data for the current frame of the GUI. Display driver 130 can then read from frame buffer 126 to generate a video output signal that can be rendered by a display device.

Performance-monitoring module 128 can execute a workload script that generates input events (e.g., mouse events) for a virtual desktop at a VDI server node, and measures the display performance of the VDI server node by detecting the delay for frame updates associated with corresponding input events. Execution of the workload script is protocol independent. VDI servers 102 can implement any VDI protocol, and the protocol can be unaware that the client device is performing a test. The workload script can cause user applications 118 and guest OS platform 120 on a VDI server to generate certain frames that are monitored by client devices 106 to compute a display performance metric. Performance-monitoring module 128 stores timestamps for the input events and the detected frames, and generates performance data from the detected frames and the stored timestamps. Further, performance-monitoring module 128 can send performance data to a performance server 104, which in turn can provide information on the user's experience with the virtual desktop hosted on VDI servers 102.

In some embodiments, performance-monitoring module 128 can read information directly from frame buffer 126. Performance-monitoring module 128 can also receive information from decoder 124 or from some other accessible software layer within the display stack to read pixel color values that are displayed to the user. As described below, these pixel values can be used to compute a display performance metric.

Performance server 104 can host a virtual client device that executes workload scripts which cause a VDI server to generate one or more display updates. Further, the virtual client device in performance server 104 can include performance-monitoring module 128 to generate the performance data. For example, performance server 104 can include a server node at a geographic location that is remote to VDI servers 102 (e.g., in a different state or country), and generates performance data for its geographic location. As another example, performance server 104 can reside in the same server cluster as VDI servers 102, and can simulate a client device at a remote geographic location by simulating the network characteristics to the remote geographic location (e.g., by simulating network delays and packet loss rates that are characteristic of the remote geographic location).

Computing Display Performance Metric

In some embodiments, the performance-monitoring system can perform a workload by executing a script to compute a display performance metric for a virtual desktop server. The workload script can include instructions to generate input events for the GUI, such as a mouse event (e.g., click, scroll, drag, etc.), a key-input event (e.g., from a keyboard), or a touch screen event (e.g., a screen coordinate, a finger gesture, etc.). Further, the system can characterize a feature of the GUI at a regular sampling rate to determine a sequence of frames that include updates to the GUI, and match these frames to their corresponding input events. The system uses timestamp information for the input events and their corresponding frames to determine the display performance of the virtual desktop server.

Figure 2A:
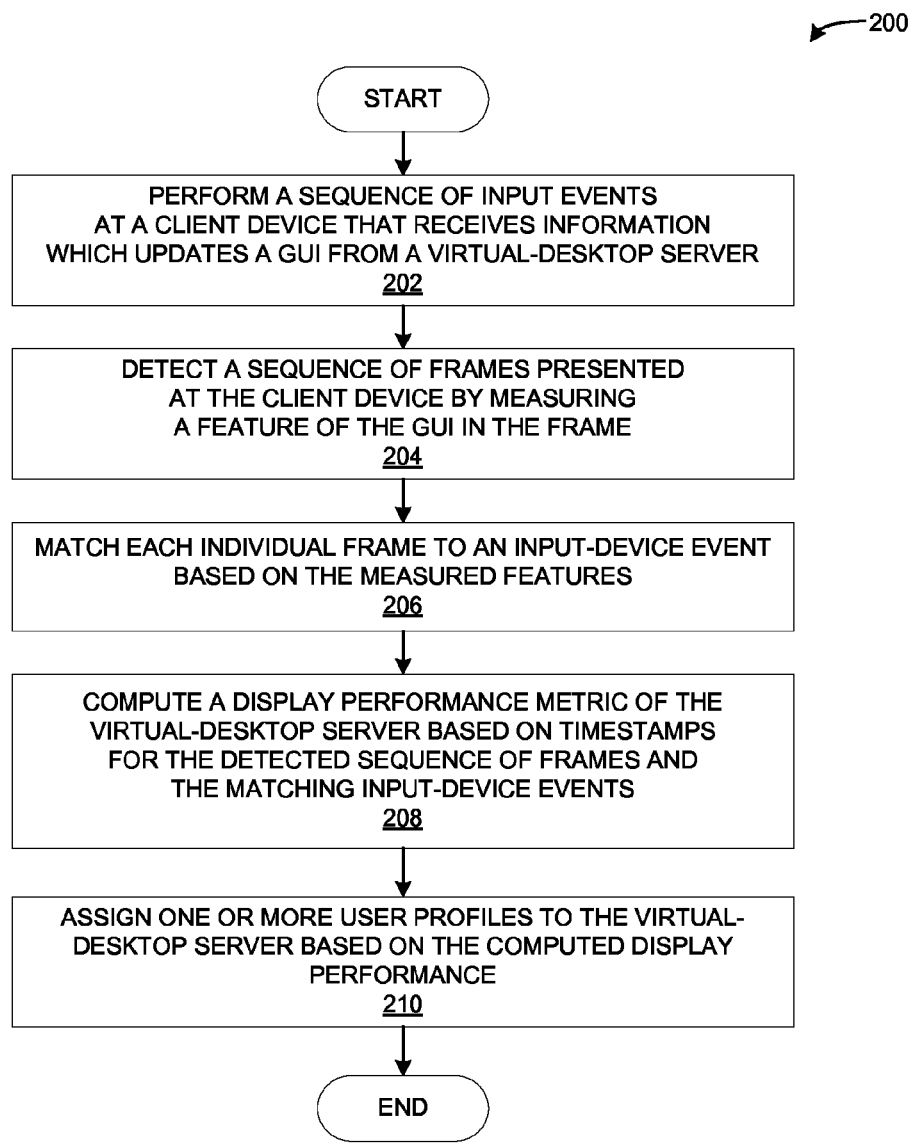
FIG. 2A presents a flow chart illustrating an exemplary process for computing a display performance metric for a virtual desktop server.

FIG. 2A presents a flow chart illustrating an exemplary process 200 for computing a display performance metric for a virtual desktop server. During operation, the performance-monitoring system can perform a sequence of input events at a client device that receives information that updates a GUI from a virtual desktop server (operation 202). These input events simulate events from an input device, such as a mouse, a keyboard, a touch screen, etc. For example, the sequence of input events can cause a mouse pointer to move across the virtual desktop. Each event in the sequence can correspond to a different pixel position of the mouse pointer on the virtual desktop.

When the system initiates an input event (e.g., to move the mouse pointer to a different pixel position), the system communicates this input event to the virtual desktop server over the network. In one embodiment, the system models each input event using the tuple: $e(t_e, n)$, where the $i^{th}$ input event $e_i$ has a sequence number n and a timestamp $t_{ei}$. When the system performs an input event, the system creates a tuple that models the input event and stores the tuple in a log file.

The system also detects a sequence of frames displayed at the client, which involves polling a frame buffer to measure a feature of the GUI in the frame (operation 204). For example, the GUI object can be color-coded to indicate a screen position or a sequence number. That is, each frame can draw the GUI object in a different color. As a result, the system can sample a fixed number of pivot points that are distributed evenly throughout a portion of the GUI to detect a window movement or an image position. A change in color can indicate whether the GUI object has been updated in any way (e.g., due to moving, resizing, rotating, or any other transformation). The system can calculate a motion vector for each pivot point, and uses a majority-voting algorithm to determine a final motion vector for the frame. The system models the motion vector for each frame using the tuple: $u(v, t)$, where the $i^{th}$ frame $u_i$ has a motion vector $v_i$ and a timestamp $t_{ui}$. The system then stores the motion vector and the timestamp for the frame in the log file. (Note that a motion vector is typically a two-dimensional vector that indicates the movement of a pixel or pattern.)

Next, the system matches each individual frame to an input event based on the measured features (operation 206). For example, the system can determine a sequence number for each frame that updates the color-coded object based on the sampled color or the motion vector, such that the sequence number corresponds to an input event that was generated during operation 202.

The system then computes a display performance metric for the virtual desktop server based on timestamps for the detected sequence of frames and the input events (operation 208). In some embodiments, the system can process the log file to perform operations 206 and 208 in a post-processing operation. Further, during operation 208, the system can compute at least one of the following display performance metrics:

Total run time: If the system detects a total of n motion vectors, the system can compute the total runtime of a workload test using:

$$T = t_{un} - t_{e1} \quad (1)$$

The system starts a timer when the first event in a sequence is communicated to the virtual desktop server, and uses this timer to generate timestamps for each input event and for each motion vector. Equation (1) computes the total runtime T as the difference between the timestamps for the last detected motion vector $t_{un}$ and the first input event $t_{e1}$.

Smoothness: The system computes a smoothness metric as the mean delay between GUI-updating frames (X) and the standard deviation to the mean ($\sigma_x$):

$$X = \frac{\sum (t_{ui} - t_{u(i-1)})}{n} \quad (2)$$

$$\sigma_x = \sqrt{\frac{\sum t_{ui} - X}{n}} \quad (3)$$

Equation (2) computes the mean delay between GUI-updating frames, X, as the difference between the timestamps for two consecutive motion vectors. Further, equation (3) computes the standard deviation to the frame timestamps.

Responsiveness: The system computes the responsiveness metric as the mean in round-trip delay between each input event and a corresponding frame:

$$R = \frac{\sum (t_{ui} - t_{ei})}{n} \quad (4)$$

In equation (4), $(t_{ui} - t_{ei})$ indicates the round-trip delay between an input event and a corresponding frame. Further, n is the total number of motion vectors in the log file (e.g., a number of GUI-updating frames that were detected), and i is an iterator to the motion vectors stored in the log file.

Frame Yield: The system can compute the number of frames that were detected by counting the number of motion vectors in the log file: |u|. The system can also compute the number of frames that were dropped by the virtual desktop server or during transmission by computing:

$$D = |e| - |u| \quad (5)$$

In equation (5), |e| indicates the number of input events in the log file. Further, the system can compute the frame yield using:

$$Y = |u|/|e| \quad (6)$$

In equation (6), the frame yield indicates the fraction of input events for which the system detects a motion vector.

In some embodiments, the system runs each workload script locally to collect local performance data and uses the local performance data to determine a baseline display performance score. Then, the system executes each workload script at the remote virtual desktop server to collect the remote performance data, and uses the local performance data to determine the raw display performance score for the virtual desktop server. The baseline display performance score provides a reference corresponding to the native display performance as if the user was accessing the application locally. The system can then calculate a user experience index by comparing the baseline display performance score with the raw display performance score. In addition, the user experience index metric may be normalized to generate this index based on how many frames were observed at the local client device and the total runtime when performing a heavy workload script.

The system then assigns one or more user profiles to the virtual desktop server based on the computed display performance (operation 210). In some embodiments, the system may execute workload scripts that target each of the different user profiles (e.g., a heavy user, a medium user, and a light user), and can assign a user profile to the virtual-desktop server based on the performance data generated for the user profile. A user profile can indicate a minimum requirement for one or more display performance metrics (e.g., the runtime, smoothness, responsiveness, and frame yield metrics). Further, a user profile can include a workload script whose display load and/or level of interactivity is designed for a target user category (e.g., the load can be more intense for the heavier user profiles than for the lighter user profiles, and involves interacting with applications that are of interest to a target user). For example, if the virtual desktop server performs well for the medium user and the light user profiles but not for the heavy user profile, the system can assign the medium user profile and the light user profile to the virtual desktop server.

Figure 2B:
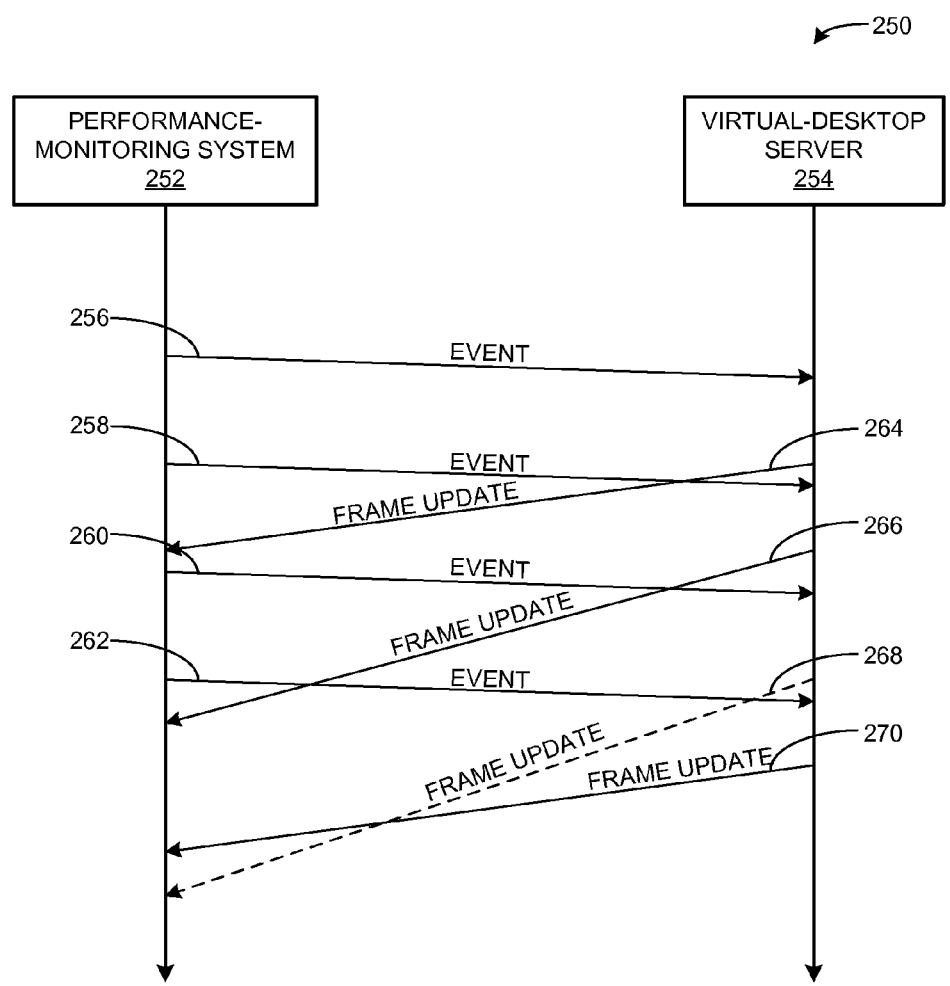
FIG. 2B illustrates an exemplary communication between a performance-monitoring system and a virtual desktop server.

FIG. 2B illustrates an exemplary communication between a performance-monitoring system 252 and a virtual desktop server 254. During operation, performance-monitoring system 252 can transmit a sequence of input events to virtual desktop server 254 (e.g., input events 256, 258, 260, and 262). Further, performance-monitoring system 252 can receive information that updates a sequence of frames from virtual desktop server 254 (e.g., frame updates 264, 266, and 270), such that each frame includes an update to the GUI in response to an input event.

In some embodiments, it is possible that the virtual desktop server may not render a frame for every input event (e.g., frame update 268, which corresponds to event 260). This may occur when performance-monitoring system 252 or virtual desktop server 254 coalesces multiple input events into fewer events so that they have the same end-result. For example, an application at virtual desktop server 254 that receives mouse events may coalesce multiple window-dragging events in order to catch up with newer mouse move events. This may occur when the time it takes the application to render the display buffer between successive window dragging events is larger than the time interval between these events. As another example, the display encoder of virtual desktop server 254 may not be able to keep up with the number of frames generated for the window dragging events, and may encode fewer frames of visual data for transmission to performance-monitoring system 252. Each of these events can result in a loss of smoothness in the window dragging animation that the user perceives as "lag" or "jitter" rather than a smooth movement. It is possible that performance-monitoring system 252 may not render every frame generated by virtual desktop server 254. For example, virtual desktop server 254 may generate the frame corresponding to update 268 successfully, but performance-monitoring system 252 may not receive frame update 268 due to data packets being dropped or delayed in the network.

Color-Coded Display Elements

In some embodiments, when the virtual desktop server renders a frame to update a GUI for a workload, the virtual desktop server can render a GUI element using a color that can be used to determine a coordinate or a sequence number for the frame. For example, a workload that tests the virtual desktop server's responsiveness may drag a window across a virtual desktop of the GUI in a predetermined trajectory and at a predetermined rate. The system can fill the window at each frame using a color that corresponds to either the window's position or to a sequence number for the frame. In some embodiments, the virtual desktop server can use a color-encoding lookup table or a color-encoding function to determine a color for a GUI object before generating a frame.

Further, the performance-monitoring system can use the color-decoding lookup table or color-decoding function to detect and identify an updated frame when a color-coded GUI object changes color. In one embodiment, the performance-monitoring system can sample colors at a set of pivot points of the virtual desktop at a regular sampling rate. Then, for each detected update to the GUI, the performance-monitoring system can determine the window location and its timestamps from the sampled pixel colors. Using the sampled colors over several time intervals, the system can then determine a distance traveled by the window (in pixels) and the corresponding frame-rate (in frames per second).

In one embodiment, a statically colored window is created and is moved, resized, or scrolled during the performance test. Each pixel of the window is painted with a color using a location-based painting algorithm (described below). The window's color scheme remains constant during the test, and, as the test is performed, a predetermined set of pivot/observation points are used to sample the pixel colors. Based on these observed colors, the system can determine which pixels in the window these observation points correspond to (or whether an observation point overlaps with part of the window at all). Using this method, the system can determine the position of the window in each frame. Theoretically, one would only need one observation point at a time to be overlapped by the window to determine the window's position. However, given that lossy compression may alter the pixel color, multiple observation points can be used. Each observation point may be used to derive a corresponding window position, although different observation points may lead to slightly different values. A majority voting method can then be used to determine the most likely window position. It is also possible to just use the various window locations from the observation points to generate a positional uncertainty, i.e., window is located at (x, y)+/−err.

In some embodiments, the color encoding and decoding functions are performed by first flattening the pixel locations (in the two-dimensional Cartesian coordinate plane) and the 24-bit color space (e.g., in the three-dimensional RGB (red, green, blue) color space) into a single dimension. This one-dimensional space facilitates performing a one-to-one mapping between the pixel coordinates and the color space. For example, if the virtual desktop is rendered into a rectangular image that has a width w and a height h, then the flattened (one-dimensional) index is calculated for any pixel location (x, y) as follows:

$$\text{index}=w*y+x \quad (7)$$

The color for this computed index is calculated as follows:

$$\text{color}=a*\text{index}+b \quad (8)$$

In equation (7), the Cartesian coordinate (0, 0) can correspond to a corner of a rendered frame for the virtual desktop (e.g., the top-left pixel location), or can correspond to the top-left corner of a rendered window. Further, in equation (8), the color can be a 24-bit number (e.g., an RGB value with a 24-bit color depth) where the first 8 bits represent the intensity of the red component, the middle 8 bits represent the intensity of the green component, and the last 8 bits represent the intensity of the blue component. The values a and b can be selected to map the RGB color space to the one-dimensional space.

The performance-monitoring system can decode the Cartesian coordinates (e.g., the x and y values) from the color value as follows:

$$(x,y) = \text{index} = \text{round}((\text{color}-b)/a) \qquad (9)$$

The color encoding and decoding formulas (equations 8 and 9) can be adjusted to account for lower color depths, or to account for display compression algorithms that truncate the color depth, by adjusting the values for a and/or b to model a desired color depth.

Figure 3:
FIG. 3 presents an exemplary color matrix.

FIG. 3 presents an exemplary color matrix 300. Color matrix 300 can include a two-dimensional color image where each coordinate encodes a unique color using equations (7) and (8), such that w=8, a=5 and b=500. In some embodiments, color matrix 300 can function as a color encoding and decoding lookup table, and the virtual desktop server can use color matrix 300 to determine a color for a GUI object before generating a frame. For example, the virtual desktop server can select a color from color matrix 300 based on a Cartesian coordinate (x, y) for a GUI element (e.g., a window's coordinate, a window's size (e.g., (width, height)), or a mouse pointer's coordinate). As another example, the virtual desktop server can select a color from color matrix 300 based on a one-dimensional index value. The one-dimensional value can be computed from the state of a GUI element (e.g., a window's length, width, diagonal size, and/or area), or a GUI controller (e.g., a scroll bar's position, a scrubber's position, an entry field's value, etc.). The performance-monitoring system can use color matrix 300 to decode an index value from a color-coded GUI object at a predetermined sampling rate and compute a display performance metric of the virtual server based on how often it receives a frame update that updates the color-coded GUI object.

In addition, the virtual desktop server can select a color from color matrix 300 based directly on a sequence number of the workload. For example, the virtual desktop server may perform a workload that involves rendering an object (e.g., a three-dimensional object) after performing each of a sequence of transformations on the object. The virtual desktop server can use equation (7) to determine a Cartesian coordinate (x, y) from each sequence number, and can use color matrix 300 to select a different color for each rendered transformation in the sequence. The performance-monitoring system can sample an encoded color at a regular sampling rate to determine the current sequence number for each rendered frame, and to determine a frame rate and/or any other statistical information. Further, the performance-monitoring system can use the determined sequence numbers to determine whether the client device has received a frame update.

Interactive Workloads

In some embodiments, the performance monitoring system can execute a workload script that performs a sequence of input events to interact with a GUI element of a desktop environment. When the virtual desktop server receives each input event, the virtual desktop server generates an update to the GUI element so that it includes a color that corresponds to the input event. For example, a window can be statically filled with the color gradient of color matrix 300 so that the client device can detect a color change when it moves the window while sampling one or more fixed pixel locations of the frame. In a further embodiment, the virtual desktop server can use color matrix 300 to select a color for each frame that updates the GUI element. The index to color matrix 300 can be determined from a timestamp for when the input event is received, or from a characteristic of the GUI element (e.g., a screen coordinate) after the input event is performed. In some embodiments, the input events interact with a window of the desktop environment. However, in other embodiments, the input events can interact with any other type of GUI element of the desktop environment or any application, such as an icon, a scroll bar, a menu bar, a button, etc.

The performance-monitoring system can characterize a feature of the GUI at a regular sampling rate to determine a sequence of frames that include updates to the GUI element, and to match these frames to their corresponding input events. For example, when the performance-monitoring system detects a change in color of a portion of the GUI element (e.g., the body of a window), the system can assign a timestamp to the current frame, and can use the detected color to assign a sequence number to the current frame.

Figure 4:
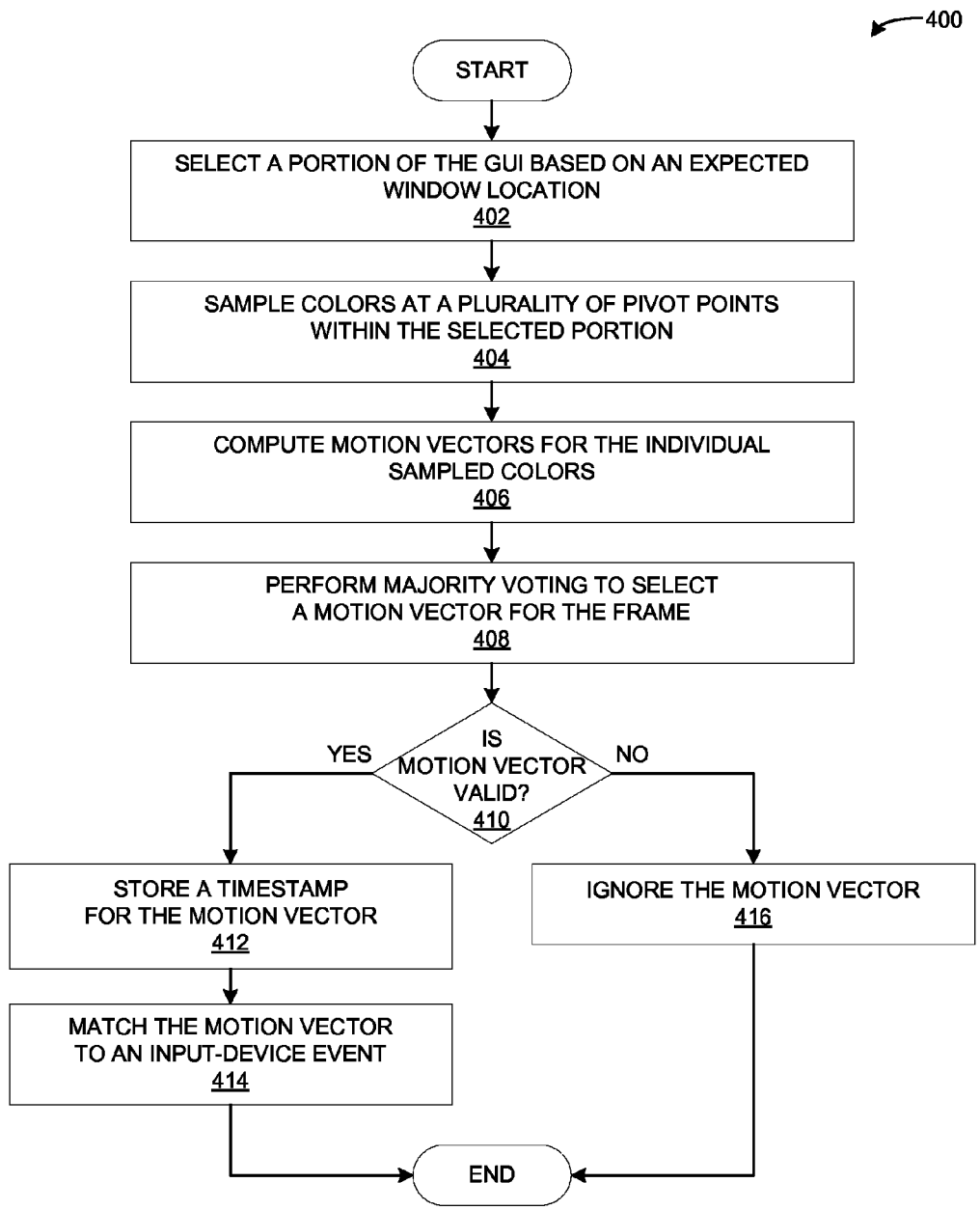
FIG. 4 presents a flow chart illustrating an exemplary process for matching an update to a GUI element to an input event based on a selected color.

FIG. 4 presents a flow chart illustrating, by way of example, a process 400 for matching an update to a GUI element to an input event based on a selected color. Initially, the system may select a portion of the GUI based on an expected window location (operation 402). For example, the system may know a previous location of a window based on a color that was previously sampled from the window. If the input events of the workload move or resize the window, the system can use the previously known location and dimensions of the window to determine a portion of the GUI that it expects the window to cover after the next input event. This way, as the color of the window changes while the window is dragged across the GUI screen, the system can select portions of the GUI that follow the window's movement.

In some embodiments, the selected portion of the GUI may completely cover the window's expected region, or may span beyond the window's borders. In addition, the selected portion of the GUI may partially overlap with the window's expected region. For example, the portion of the GUI can include an area that the system expects the window to cover after it moves a certain distance or after a certain period of time.

Once the system selects a portion of the GUI, the system samples colors at a plurality of pivot points (e.g., pixel locations) within the selected portion (operation 404). In some embodiments, the system selects the plurality of pivot points so that they are evenly distributed across the selected portion based on a predetermined pattern or a predetermined pixel-selecting algorithm. In some other embodiments, the system selects the plurality of pivot points by selecting random pixel locations from within the selected portion of the GUI. The system then proceeds to determine a motion vector for the window's movement.

It is possible that the sampled colors may not all have the same value. One possibility is that some pivot points may not correspond to the color-coded portion of the GUI (e.g., some colors could be sampled from pixels outside the target window). Another possibility is that the GUI's color information can change during data transfer from the virtual desktop server (e.g., due to the color-depth information being truncated during transfer). The system can use any voting technique to select a color value or motion vector that results from the plurality of sampled colors. For example, the system can perform a majority vote to select the most popular color from the plurality of sampled colors, or to select the most popular motion vector that was computed from the plurality of sampled colors.

Table 1 presents exemplary pseudocode for determining a motion vector from a plurality of sampled colors.

TABLE 1

```
Find_Movement( )
    For each pivot point (x_i, y_i)
        motion_i = find_point (x_i, y_i)    #color decode operation
        motion_k = Majority_Voting(motion_i)
        t_k = get_timestamp( )
        store t_k, motion_k
```

To determine a motion vector for the frame, the system computes motion vectors for the individual sampled colors (operation 406), and performs a majority voting to select a motion vector for the frame (operation 408).

Once the system selects a motion vector for the current frame, the system determines whether the motion vector is valid (operation 410). If the selected motion vector is not valid (e.g., the frame does not modify the target window), the system can ignore the motion vector (operation 416). If the motion vector is valid, the system has received a frame update that updates the GUI window. The system then stores a timestamp for the motion vector (operation 412), and matches the motion vector to an input event (operation 414).

Figure 5A:
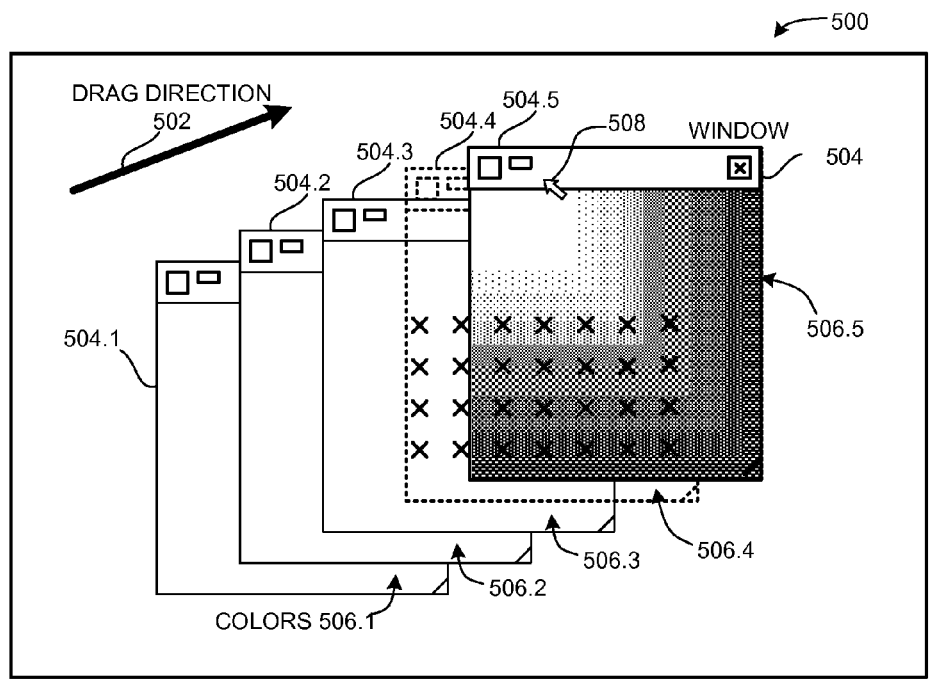
FIG. 5A illustrates an exemplary virtual desktop for a workload that drags a window.

FIG. 5A illustrates an exemplary virtual desktop 500 for a workload that drags a window. Virtual desktop 500 includes a window 504 that is moving along drag direction 502. Window 504 can be any window rendered by the virtual desktop server so that it includes a color gradient as computed using equations 7 and 8 (e.g., see color matrix 300 of FIG. 3). For example, the window's color gradient can be generated relative to the top-left corner of the window. Then, as the workload drags window 504 along direction 502, the client device can monitor a set of fixed pivot points of the frame to detect color changes from the shifting color gradients. Alternatively, the window can be rendered so that it changes its color based on the window's coordinates. For example, window 504 can include a window from a Web browser that changes the window's color using a client-side program (e.g., a JavaScript or Flash application). As another example, window 504 can include a window from a native application that is compiled to run natively at the virtual desktop server. Further, the virtual desktop server may use color matrix 300 to select a color for window 504 based on the screen coordinates of window 504 (e.g., the screen coordinates of the top-left corner of window 504).

In some embodiments, the workload script can cause the system to generate a sequence of input events that interact with window 504 to move window 504 along drag direction 502 (e.g., during operation 202 of FIG. 2A). For example, each input event can cause a mouse pointer 508 to move window 504 along drag direction 502 by a certain distance, along a certain trajectory. The trajectory can be arbitrary, and may include, for example, a straight trajectory, a circular or curved trajectory, and/or a zig-zag trajectory (e.g., a sequence of different straight trajectories that change direction). The workload script may begin by opening window 504 at position 504.1. Then, a subsequent sequence of input events may cause window 504 to move to positions 504.1, 504.2, 504.3, 504.4, and 504.5 sequentially. These input events can include a mouse event or a touch-screen gesture (e.g., a one-finger swipe) that is performed over the rendered image for window 504 to drag window 504 along direction 502.

As the virtual desktop server receives each input event, the virtual desktop server generates window 504 at a different window position so that it has a fixed color gradient relative to the top-left corner of window 504. Alternatively, the virtual desktop server can generate window 504 to have a solid color that is selected based on the window's position relative to the top-left corner of the frame, or based on a timestamp for the input event. When the virtual desktop server generates window 504 at each of positions 504.1, 504.2, 504.3, 504.4, and 504.5, the virtual desktop server fills in window 504 using colors 506.1, 506.2, 506.3, 506.4, and 506.5, respectively.

Color Change Indicates a Timestamp: To select a color that indicates an input event's timestamp, the virtual desktop server starts a timer when it receives the first input event in a sequence. The virtual desktop server can use the timer to compute an index that increments at a determinable interval (e.g., every 10 milliseconds), and uses this index to select a color from color matrix 300 when generating window 504 at a different position. Then, the monitoring system on the client side uses the window's change in color to compute a time interval since a previous update to window 504. The monitoring system interprets the change in color as a frame number (e.g., by incrementing a sequence counter that tallies the number of frames updates received), and stores the time interval along with the frame number. The monitoring system can also use this time interval and a known window-dragging speed and direction for window 504 to compute a motion vector for window 504, and matches this motion vector to an input event (e.g., an event with a matching motion vector) that has caused window 504 to move.

Color Change Indicates a Window Position: The virtual desktop server can either draw window 504 so that it includes a fixed color gradient whose colors are selected using equations (7) and (8) relative to the top-left corner of window 504, or so that it includes a solid color that indicates the position of window 504 relative to the frame's top-left corner. The virtual desktop server processes each input event to move window 504 to a different position, and can use the coordinates for the updated position as the index to color matrix 300. Then, the monitoring system on the client side can use the window's change in color at each individual pivot point to determine a motion vector for the window, and to match this motion vector to an input event that has caused window 504 to move. Note that a pivot point's motion vector is computed based on a color change at the pivot point. If window 504 includes a color gradient, the motion vectors computed for different pivot points can match each other even though the colors sampled at these pivot points do not match.

In some embodiments, it is possible that the virtual desktop server may not render or send frames for all input events (e.g., the system may coalesce the sequence of input events into fewer events). It is also possible that the system may not draw every frame generated by the virtual desktop server (e.g., the system may not receive a subset of frame updates due to packets being dropped or delayed by the network). For example, the system may not receive a frame update that draws window 504 at position 504.4, which results in a loss of smoothness in the window-dragging animation that is perceived as "lag" or "jitter" by the user. Therefore, the performance-monitoring system can use the window's change in color to match the rendered image for window 504 to the corresponding input event, and to determine if any number of frames have been dropped.

In some embodiments, the system selects a portion of the GUI that covers the color of window 504 (e.g., during operation 402) based on where the system expects window 504 to be rendered. The system can select a portion of the GUI that is most likely to expose the color encoded in window 504, even when the system does not receive a number of frame updates. Then, the system can determine a plurality of pivot points that are evenly distributed across the selected portion of the GUI (illustrated by cross marks in FIG. 5A). For example, the system may have previously determined window 504 to be at window position 504.3, and may expect the next frame to draw window 504 at window position 504.4. The system can determine the plurality of pivot points so that they cover window positions 504.3, 504.4, and other future window positions (e.g., window position 504.5).

In some embodiments, the virtual desktop server can display the color that indicates a timestamp or window position at a predetermined portion of the GUI (e.g., outside of window 504). Then, the monitoring system on the client side can use this portion of the GUI to determine one or more pivot points.

The system can then use these pivot points to sample colors during operation 404. Some pivot points may capture a color outside of window 504, while the majority of pivot points are likely to capture a pixel color from inside window 504. As window 504 moves across virtual desktop 500 over time, the system can obtain a sufficient number of samples from window 504 to correctly determine its color and motion vector by a majority vote. Note that in FIG. 5A the system can perform a majority vote on the computed motion vectors to determine whether window 504 is at position 504.3, 504.4, or 504.5. The system can use the various motion vectors from different pivot points to compute an uncertainty value for the window's position (e.g., window 504 is located at frame position (x+/−err, y+/−err).

Figure 5B:
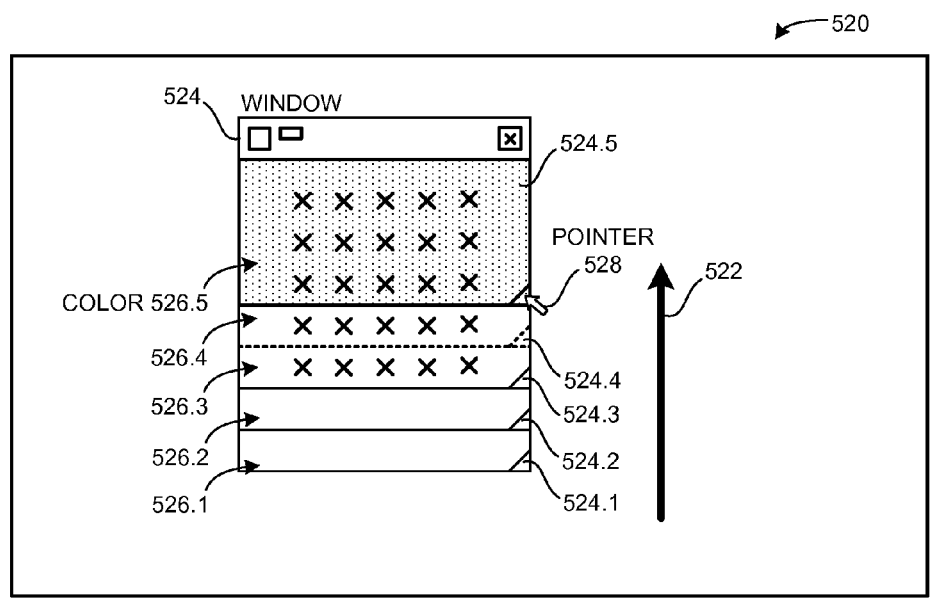
FIG. 5B illustrates an exemplary virtual desktop for a workload that resizes a window.

FIG. 5B illustrates an exemplary virtual desktop 520 for a workload that resizes a window. Virtual desktop 520 includes a window 524 that is being resized by a mouse-drag event along drag direction 522. Window 524 can be any window rendered by the virtual desktop server so that it includes a color gradient as computed using equations 7 and 8. For example, if the workload script is to resize the window from the bottom-right corner, the window's color gradient can be generated relative to the bottom-right corner of the window. Then, as the workload resizes window 524 along direction 522, the client device can monitor a set of fixed pivot points of the frame to detect color changes from the shifting color gradient. Alternatively, the window can be rendered so that it changes its color based on the window's configuration (e.g., window height and/or width). For example, window 524 can include a window from a Web browser that changes the window's color using a client-side program (e.g., a JavaScript or Flash application). As another example, window 504 can include a window from a native application that is compiled to run natively at the virtual desktop server. Further, the virtual desktop server may use color matrix 300 to select a color for window 524 based on a window size (where x and y are selected based on the width and height of window 524, respectively) or coordinates (e.g., the screen coordinates of the bottom-right corner of window 524).

In some embodiments, the workload script can cause the system to generate a sequence of input events that interact with window 524 to resize window 524 along drag direction 522 (e.g., during operation 202 of FIG. 2). For example, each input event can cause a mouse pointer 528 to reduce the size of window 524 by a certain amount. One technique, for example, can include dragging the window by the corner to resize the window's width and/or height. Another technique can include dragging the window's bottom border to resize the window's height. A further technique can include dragging one of the window's side borders to resize the window's width. The workload script may begin by opening window 524 at configuration 524.1. Then, a subsequent sequence of input events may cause window 524 to be resized into configurations 524.1, 524.2, 524.3, 524.4, and 524.5 sequentially. These input events can include a mouse event or a touch-screen gesture (e.g., a one-finger swipe) that is performed over the rendered image for window 524 to drag a corner of window 524 along direction 522.

As the virtual desktop server receives each of these input events, the virtual desktop server generates window 524 to include a fixed color gradient, or to include a solid color that indicates a timestamp for the input event or indicates a configuration for window 524. Specifically, when the virtual desktop server generates window 524 at each of window configurations 524.1, 524.2, 524.3, 524.4, and 524.5, the virtual desktop server fills in window 524 using colors 526.1, 526.2, 526.3, 526.4, and 526.5, respectively. If the color indicates a window configuration, the virtual desktop server processes each input event to update the window configuration, and uses a feature of the window's configuration (e.g., the window dimensions) as the index to color matrix 300. Then, the performance-monitoring system can use the window's change in color to determine a motion vector for the window, and can match this motion vector to an input event that has caused the window to be resized.

In some embodiments, the system may not receive a frame update for the window-resize animation (e.g., for window configuration 524.4), which results in the window-resizing animation being perceived by the user to "lag" or have "jitter." This can happen when the virtual desktop server does not render or transfer a frame for one or more input events (e.g., due to a sequence of events being coalesced), or when the system does not receive every frame update transmitted by the virtual desktop server due to packets being dropped or delayed by the network. Therefore, the performance-monitoring system can use the window's change in color to match the rendered image for window 524 to the corresponding input event, and to determine if any number of frames have been dropped.

In some embodiments, the system selects a portion of the GUI that covers the color of window 524 (e.g., during operation 402) based on where the system expects window 524 to be rendered. The system can select a portion of the GUI that is most likely to expose the color encoded in window 524, even when the system does not receive a number of frame updates. Then, the system can determine a plurality of pivot points that are evenly distributed across the selected portion of the GUI (illustrated by cross marks in FIG. 5B). For example, the system may have previously determined window 524 to have window configuration 524.3, and may expect the next frame to render window 524 at window configuration 524.4. The system can determine the plurality of pivot points so that they cover window positions 524.3 and 524.4, and other future window positions (e.g., window position 524.5).

The system can then use these pivot points to sample pixel colors during operation 404. Some pivot points may capture a pixel color outside of window 524, while the majority of pivot points are likely to capture a pixel color from inside window 524. As window 524 becomes smaller over time, the system can obtain a sufficient number of samples from window 524 to correctly determine its color motion vector by a majority vote and determine whether window 524 has configuration 524.3, 524.4, or 524.5.

Figure 5C:
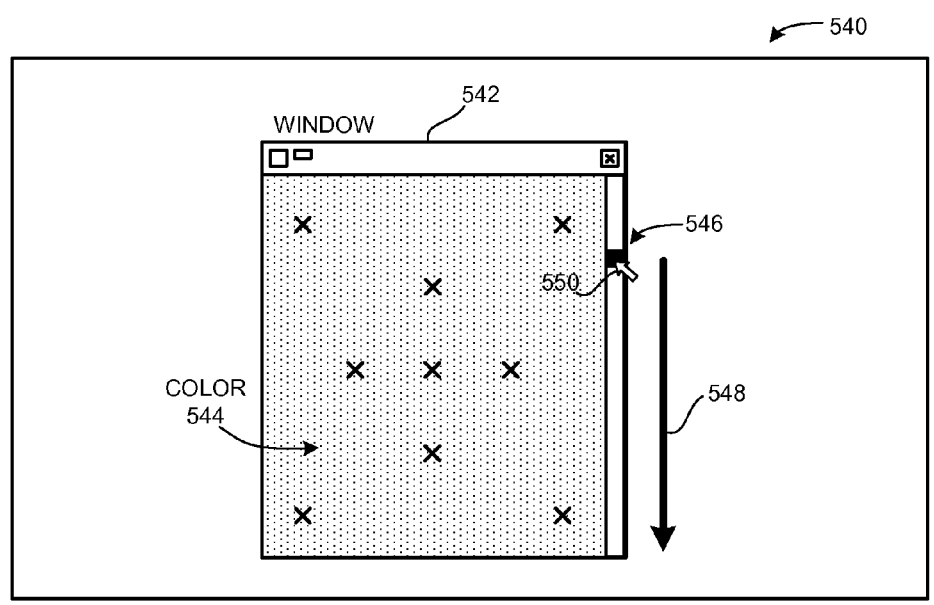
FIG. 5C illustrates an exemplary virtual desktop for a workload that scrolls a window.

FIG. 5C illustrates an exemplary virtual desktop 540 for a workload that scrolls a window. Virtual desktop 540 includes a window 542 that is being scrolled by a mouse-drag event along a drag direction 548. Window 542 can be any window rendered by the virtual desktop server so that it includes a color gradient as computed using equations 7 and 8, for example, relative to the top-left corner of the window's content. Then, as the workload scrolls window 542 along direction 548, the client device can monitor a set of fixed pivot points of the frame to detect color changes from the shifting color gradients. Alternatively, the window can be rendered so that it changes color 544 based on the window's page number. For example, window 542 can include a window from a Web browser that changes color 544 using a client-side program (e.g., a JavaScript or Flash application). As another example, window 542 can include a document or slide presentation that displays a different color 544 at each page. Color 544 for each page of window 542 can be selected from a lookup table, such as color matrix 300. To select an entry of matrix 300, the system can determine index values x and y based on the current page number of window 542.

In some embodiments, the workload script can cause the system to generate a sequence of input events that interact with window 542 to scroll along drag direction 548 toward a different page (e.g., during operation 202 of FIG. 2). The scroll direction can include a horizontal direction (e.g., via a horizontal scroll event), or a vertical direction (e.g., via a vertical scroll event). For example, each input event can cause a mouse pointer 550 to scroll a GUI controller 546 (e.g., a horizontal or vertical scroll bar) by a certain number of pages. The workload script may begin by opening window 542 to the first page. Then, a following sequence of input events may cause window 542 to scroll across a plurality of different pages, such that each page displays a different portion of the color gradient or displays a different color in accordance with matrix 300. These input events can include a mouse event or a touch-screen gesture (e.g., a one-finger swipe) that is performed over the rendered image for window 542 to scroll along direction 548.

As the virtual desktop server receives each of these input events, the virtual desktop server generates an image of window 542 to include a fixed color gradient or to include a solid color inside window 542 that matches its current page number, and transmits each of these frames to the performance-monitoring system. Then, the performance-monitoring system can use the change in color at the pivot points to determine a motion vector for the window, and can match this motion vector to an input event (e.g., an event with a matching motion vector) that has caused the window to scroll to the displayed page.

In some instances, the system may not receive some frame updates for the window-scrolling animation, which results in the user perceiving the window-scrolling animation to "lag" or have "jitter." This can happen when the virtual desktop server does not render or transmit a frame for one or more input events (e.g., due to a sequence of events being coalesced), or when the performance-monitoring system does not receive every frame update transmitted by the virtual desktop server due to dropped or delayed packets. Therefore, the performance-monitoring system can use the window's change in color to match the rendered image for window 542 to the input event that has caused window 542 to be scrolled to its current page, and to determine if any frame has been dropped by the virtual desktop server or during transmission.

In some embodiments, the system selects a portion of the GUI that covers the color of window 542 (e.g., during operation 402) based on the window's expected coordinates. The system can determine a plurality of pivot points that are evenly distributed across the selected portion of the GUI (illustrated by cross marks in FIG. 5C). The system can then use these pivot points to sample pixel colors during operation 404, and computes a motion vector for these sampled pixel colors. Next, the system selects a motion vector that is likely to indicate the correct page number for window 542 (e.g., by performing a majority vote, or computing an average color, from the computed motion vectors).

Rendered-Object Workload

In some embodiments, the system can execute a workload script that launches an image-rendering application, which executes at the virtual desktop server, and renders an animation. For example, the image-rendering application can render a sequence of images by transforming and rendering a 3-dimensional model of an object. In some other examples, the image-rendering application can display a sequence of images, such as a movie file (e.g., an MPEG movie or a Flash animation), a presentation slide-show, etc.

The workload script can execute a sequence of input events that cause the image-rendering application to render a different image for each event, such that the background color of each rendered image corresponds to a different sequence number. For example, the image-rendering application can use a local sequence number (e.g., with a starting value of 0) to select a background color for the rendered image. In some embodiments, the image-rendering application can use this sequence number to select the background color based on a predetermined sequence (e.g., color matrix 300). After rendering each image, the image-rendering application can increment the sequence number by a determinable amount (e.g., a value of 1) so that the next rendered image has a different background color from the previously rendered images.

The performance-monitoring system can determine updates to the GUI that correspond to input events of the workload script by detecting background color changes of the rendered image frames, and using each different background color to assign a motion vector and a timestamp to each frame.

Figure 6:
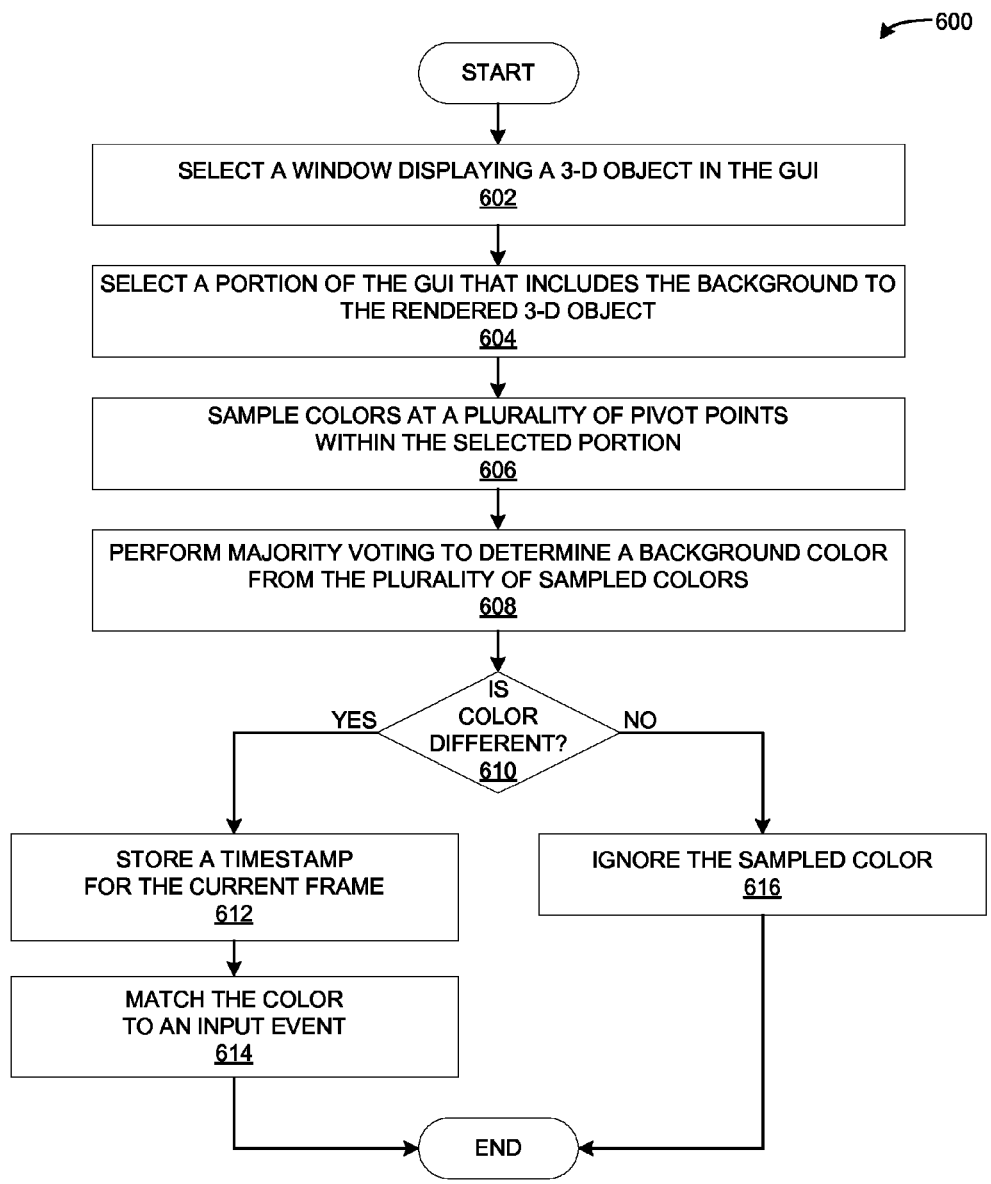
FIG. 6 presents a flow chart illustrating an exemplary process for matching a frame to an input event based on a sampled background color.

FIG. 6 presents a flow chart illustrating an exemplary process 600 for matching a frame to an input event based on a sampled background color. During operation, the system can select a window displaying a 3-dimensional object in the GUI (operation 602), and determines a portion of the window that includes the background to the rendered 3-dimensional object (operation 604). The system then samples colors at a plurality of pivot points (e.g., pixel locations) within the determined portion (operation 606), and performs a majority voting on the sampled colors to determine a background color for the frame (operation 608).

Once the system identifies a background color for the current frame, the system determines whether the color is different from previous colors (operation 610). If the background color is not different (e.g., the frame does not contain new changes to the 3-dimensional object), the system can ignore the sampled color because it has not received a frame update that updates the 3-dimensional object (operation 616). However, if the identified color is different from the background color of the previous frame, the system determines that it has received a frame update that updates the 3-dimensional object. The system stores a timestamp for the current frame (operation 612) and matches the identified color to an input event (operation 614).

Figure 7:
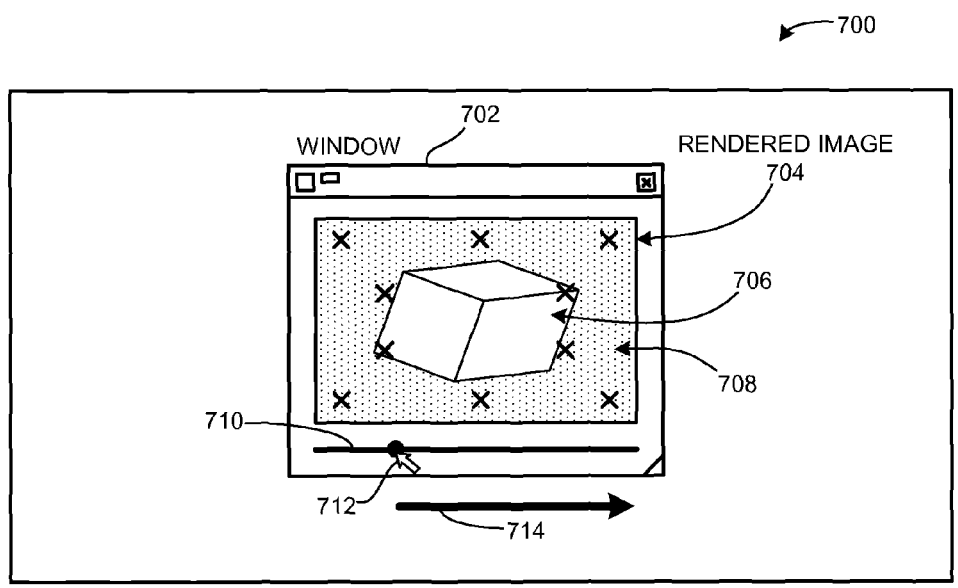
FIG. 7 illustrates an exemplary virtual desktop for a workload that transforms a rendered 3-dimensional object.

FIG. 7 illustrates an exemplary virtual desktop 700 for a workload that transforms a rendered 3-dimensional object. In this example, a virtual desktop 700 includes a window 702 that displays a rendered image 704 that includes a 3-dimensional object 706. Window 702 can be from a Web browser or a desktop application. Further, window 702 can also include a GUI controller 710 that can be used to manipulate 3-dimensional object 706.

In some embodiments, the workload script can cause the system to generate a sequence of input events that interact with GUI controller 710 to rotate 3-dimensional object 706 (e.g., during operation 202 of FIG. 2). For example, each input event can cause mouse pointer 712 to move the scrubber in GUI controller 710 along drag direction 714 by a certain distance.

During operation, the workload script can cause the system to generate a sequence of input events that manipulate 3-dimensional object 706 without interacting with GUI controller 710. For example, each input event can include a keyboard event that rotates 3-dimensional object 706 along a horizontal or vertical axis (e.g., using a corresponding arrow key). Alternatively, each input event can include a mouse event that rotates 3-dimensional object 706 along a horizontal or vertical axis (e.g., by generating a horizontal or vertical scroll event). Each input event may also be based on a touch-screen gesture (e.g., a finger swipe) that is performed over rendered image 704, or a mouse event that glides and/or drags pointer 712 over rendered image 704. The virtual desktop server responds by rotating 3-dimensional object 706 along any direction (e.g., a horizontal, vertical, or diagonal) of the finger swipe or mouse event.

To monitor the remote display performance, the system selects a portion of the GUI that exposes the background color 708 in rendered image 704 (e.g., during operation 604) based on the average (or maximum) width and height of 3-dimensional object 706 at various view angles. The system can select a portion of the GUI that is most likely to expose the background of rendered image 704 regardless of the angle of 3-dimensional object 706. The system can then determine a plurality of pivot points that are evenly distributed across the selected portion of the GUI (illustrated by cross marks in FIG. 7). The system can use these pivot points to sample colors during operation 606. Some pivot points may capture a pixel color from 3-dimensional object 706, while the majority of pivot points are likely to capture a pixel color from the background of rendered image 704. As 3-dimensional object 706 rotates over time, the system can obtain a sufficient number of samples from the background to determine the correct motion vector (which indicates a number of frames that have been presented) by a majority vote.

In some embodiments, the virtual desktop server can display the color at a predetermined portion of the GUI (e.g., outside of window 702). Then, the monitoring system on the client side can use this portion of the GUI to determine one or more pivot points.

Virtual Globe Workload

In some embodiments, the system can execute a workload script that launches an application which executes at the virtual desktop server, and displays a virtual globe centered on a distinguishable object (e.g., at a predetermined location). The virtual globe can include a software application that renders an interactive map. The virtual globe can either be run as a desktop application on the virtual desktop server or can be accessed from a third-party Web service by the virtual desktop server via a Web browser.

The workload script can execute a sequence of input events that cause the virtual globe to zoom into or out of an object on the virtual globe, and the system can evaluate the display performance of the virtual desktop server by measuring features of the object (e.g., a radius along a horizontal, vertical, and/or diagonal dimension). The object should be distinguishable from other objects on the display screen to facilitate the measurement. For example, the object can be a circular stadium whose roof color provides a sufficiently distinguishable contrast against other surrounding colors.

Figure 8:
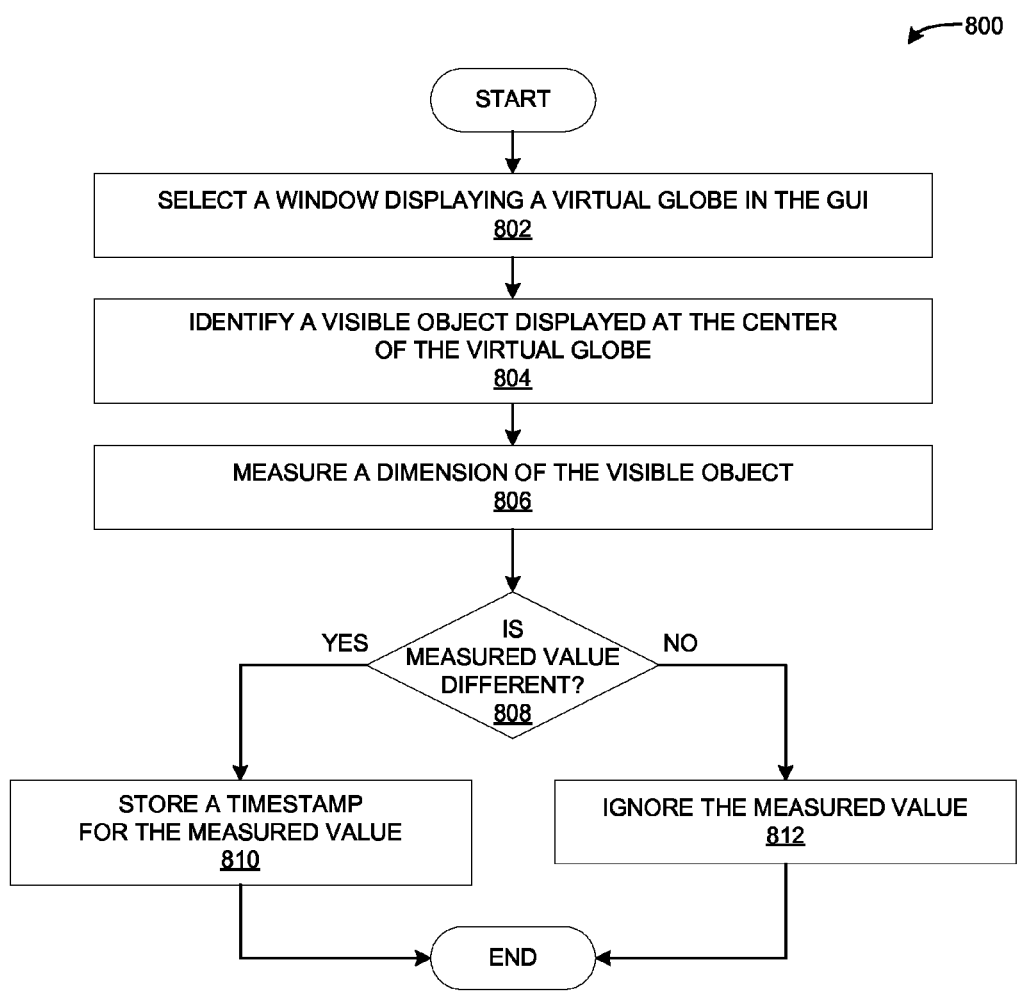
FIG. 8 presents a flow chart illustrating an exemplary process for measuring a dimension of a visible object on a virtual globe.

FIG. 8 presents a flow chart illustrating an exemplary process 800 for measuring a dimension of a visible object on a virtual globe. During operation, the system selects a window displaying a virtual globe in the GUI (operation 802). Then, the system identifies a visible object displayed at the center of the virtual globe, where the object has a color that can sufficiently stand out from the surrounding areas (operation 804).

Next, the system measures a dimension of the visible object (operation 806). The system can, for example, determine a number of pixels along one or more dimensions that include the visible object's color or range of colors. In some embodiments, the system can measure a plurality of dimensions (e.g., a horizontal, a vertical, and/or a diagonal dimension), and select the minimum, the maximum, or an average of the measured dimensions.

The system then determines whether the measured value is different from a previous measurement (operation 808). If the system determines that the measured value matches that of a previous frame, the system can ignore the measured value because it has not received a frame update that updates zoom level the virtual globe (operation 812). However, if the system determines that the measured value is different from that of a previous frame (operation 808), the system can assume that it has received a frame update that updates the virtual globe, and stores a timestamp (operation 810).

In some embodiments, the system can compute a frame-yield performance metric for the virtual globe workload by counting the number of input events generated (|e|), the number of measured frames (|u|), and comparing the frame yield using equation (6): $Y=|u|/|e|$.

Figure 9:
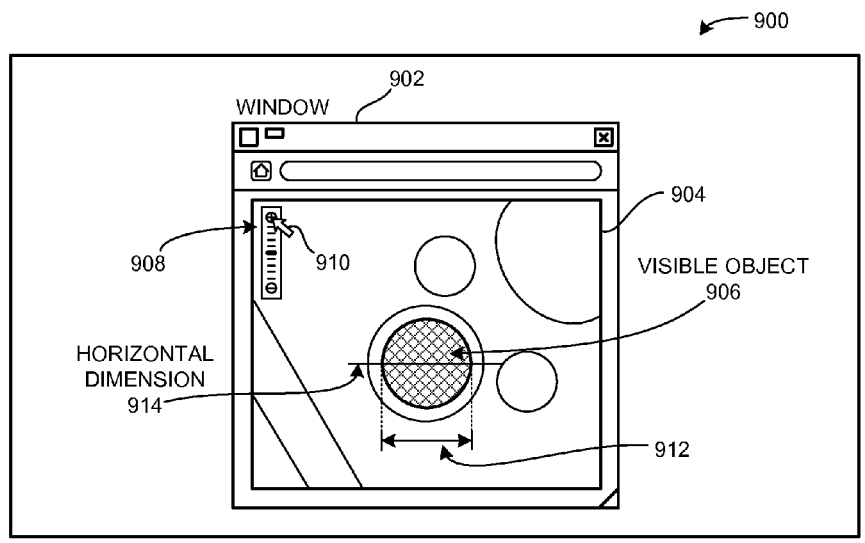
FIG. 9 illustrates an exemplary virtual desktop for a workload that performs a zoom operation on a window displaying a virtual globe.

FIG. 9 illustrates an exemplary virtual desktop 900 for a workload that performs a zoom operation on a window displaying a virtual globe. Virtual desktop 900 includes a window 902 that displays a virtual globe. Window 902 can be from a Web browser that accesses a virtual globe from a Web service, or can be from a desktop application that renders the virtual globe at the virtual desktop server. Window 902 can include a virtual-globe display 904 that displays the virtual globe so that it is centered on a visible object 906 at a certain zoom level. Further, virtual-globe display 904 can also display a GUI controller 908 that can be used to change the zoom level for the virtual globe (e.g., by clicking on a desired zoom level, or by clicking on the zoom-in or zoom-out button of GUI controller 908).

In some embodiments, the workload script can cause the system to generate a sequence of input events that interact with GUI controller 908 to change the zoom level of the virtual globe (e.g., during operation 202 of FIG. 2). For example, one input event can include a mouse event that moves the mouse cursor to a button of GUI controller 908 (e.g., a zoom-in button or a zoom-out button). Subsequent input events can be mouse-button events that trigger the button.

As another example, the workload script can generate input events that select an explicit zoom level for the virtual globe. Each zoom event can be performed by input events that first move the mouse pointer to a target zoom-level button of GUI controller 908 and then generate a mouse-click event to trigger the target zoom-level button.

In some embodiments, the workload script can generate a sequence of input events that change the zoom level of the virtual globe without interacting with GUI controller 908. For example, each input event can include a keyboard event that zooms in or out of the virtual globe (e.g., using the "+" or "−" key values). As another example, each input event can include a mouse event that zooms in or out of the virtual globe (e.g., by generating a mouse scroll-wheel event using an "up" or "down" value). As a further example, an input event can include a touch-screen gesture performed over virtual-globe display 904 to zoom in or out of the virtual globe (e.g., a pinch-open or pinch-close gesture that zooms in or out of the virtual globe by a predetermined amount).

In some embodiments, the system measures a dimension of the visible object (e.g., during operation 806) by sampling pixel colors along a dimension of virtual-globe display 904. For example, the system can sample pixel colors at a plurality of pivot points along horizontal dimension 914. The system can detect the right-most border of visible object 906 by starting at a pivot point located at the center of virtual-globe display 904, and can increment the horizontal coordinate of the pivot point after sampling each color, thereby traversing toward the right of horizontal dimension 914. The system can determine the image coordinates of the right-most border when it detects a substantial change in color (e.g., the color becomes different for a determinable number of consecutive pixels). The system can detect the left-most border of object 906 in a similar fashion.

Once the system determines the right-most and left-most borders of visible object 906, the system computes measurement 912 by subtracting the coordinates of the left-most border from those of the right-most border along horizontal dimension 914.

Figure 10:
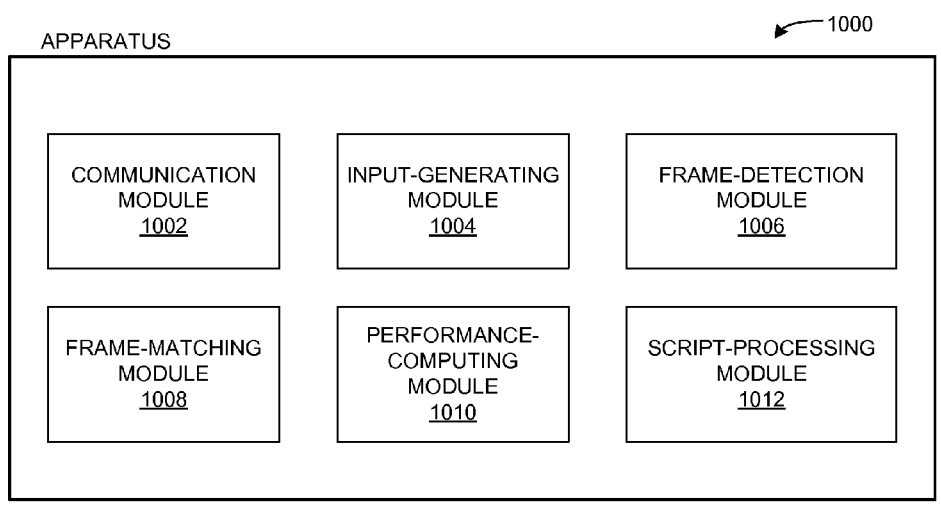
FIG. 10 illustrates an exemplary apparatus that evaluates a display performance metric for a virtual desktop server.

FIG. 10 illustrates an exemplary apparatus 1000 that facilitates computing a display performance metric for a virtual desktop server. Apparatus 1000 includes a communication module 1002, an input-generating module 1004, a frame-detection module 1006, a frame-matching module 1008, a performance-computing module 1010, and a script-processing module 1012. These modules may communicate with one another via a wired or wireless communication channel. Apparatus 1000 may be realized using one or more integrated circuits, and may include fewer or more modules than those shown in FIG. 10. Further, apparatus 1000 may be integrated in a computer system, or realized as a separate device which is capable of communicating with other computer systems and/or devices. include In some embodiments, input-generating module 1004 can perform a sequence of input events for a GUI. Communication module 1002 can send the sequence of input events to a virtual desktop server, and receive frame updates that update the GUI from the virtual desktop server. Frame-detection module 1006 can detect a sequence of frames presented at the client computer by measuring a feature of the GUI in the frame. Frame-matching module 1008 can match each individual frame to an input event based on the measured feature of the GUI. Performance-computing module 1010 can compute a display performance metric of the virtual desktop server based on timestamps for the detected sequence of frames and the matching input events. Script-processing module 1012 can execute a workload script that includes commands to generate the sequence of input events for the GUI.

Figure 11:
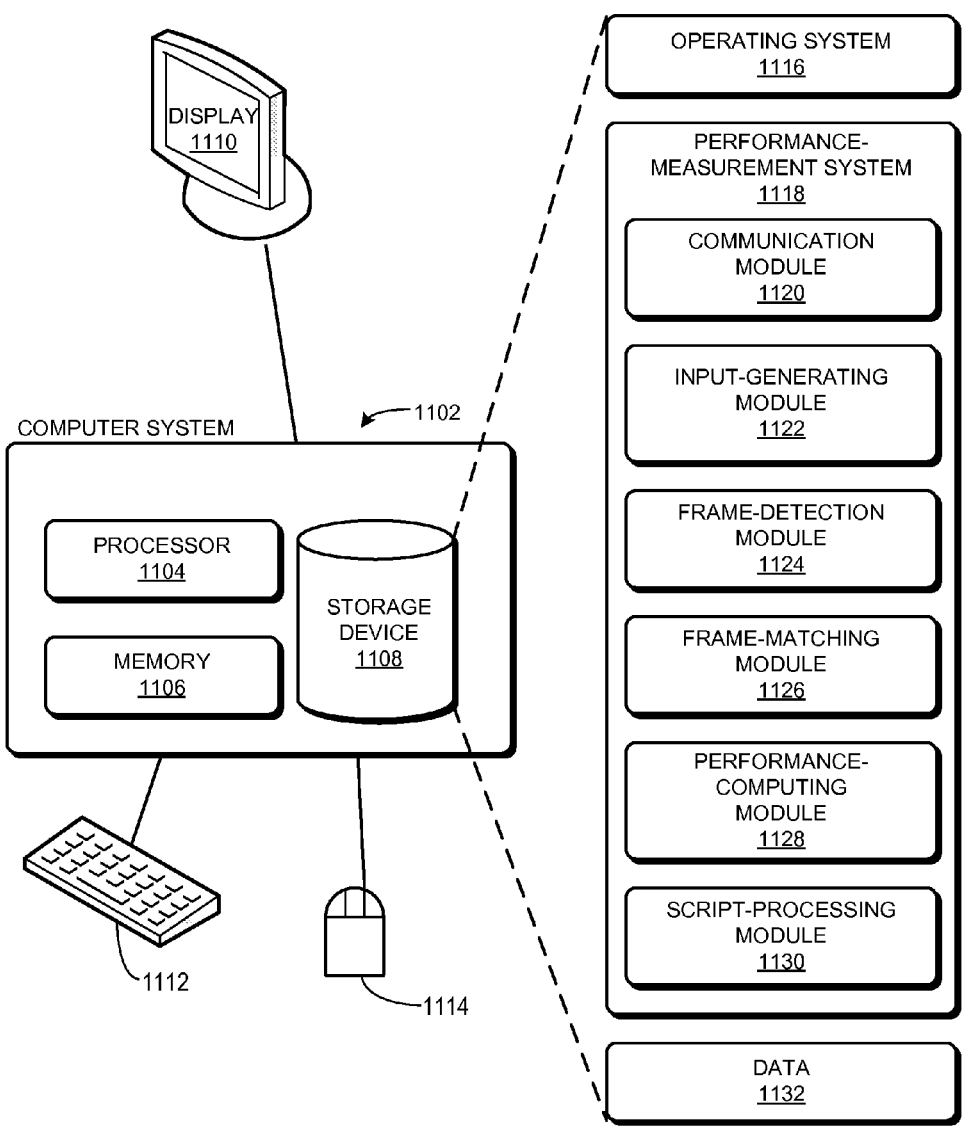
FIG. 11 illustrates an exemplary computer system that facilitates computing a display performance metric for a virtual desktop server.

FIG. 11 illustrates an exemplary computer system 1102 evaluates a display performance metric for a virtual desktop server in accordance with an embodiment. Computer system 1102 includes a processor 1104, a memory 1106, and a storage device 1108. Furthermore, computer system 1102 can be coupled to a display device 1110, a keyboard 1112, and a pointing device 1114. Storage device 1108 can store an operating system 1116, a display performance measurement system 1118, and data 1132.

Display performance monitoring system 1118 can include instruction modules, which when executed by computer system 1102 can perform methods described in this disclosure. Specifically, display performance measurement system 1118 includes an input-generating module 1122 for performing a sequence of input events for a GUI. Further, display performance measurement system 1118 can include a communication module 1120 for sending the sequence of input events to a virtual desktop server, and receiving rendered frames ( ). Also include is a frame-detection module 1124 for detecting a sequence of frames presented at the client computer by measuring a feature of the GUI in the frame. A frame-matching module 1126 matches each individual frame to an input event based on the measured feature of the GUI. A performance-computing module 1128 computes a display performance metric of the virtual desktop server based on timestamps for the detected sequence of frames and the matching input events. Further, a script-processing module 1130 executes a workload script that includes commands to generate the sequence of input events for the GUI.

Data 1132 can include any data that is required as input or that is generated as output by the methods and/or processes described in this disclosure, such a workload script, a log file, and one or more performance results. In some embodiments, the log file can store timestamps for the input events, and/or for frames or motion vectors.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing description has been presented for purposes of illustration and description only. They are not intended to be exhaustive or limiting. Accordingly, many modifications and variations will be apparent to practitioners skilled in the art. The scope of the present invention is defined by the appended claims.

What is claimed is:

1. A computer-implemented method, comprising:
    determining an object in a graphical user interface (GUI) rendered by a remote server and displayed on a client device based on display information transmitted from the remote server to the client device over a network, wherein the object is manipulated by the server in response to one or more input events, wherein the object is a three dimensional object that is animated by the remote server;
    selecting a portion of the GUI displayed on the client device that includes at least some background around the object, wherein the portion of the GUI that includes at least some background of the object is selected based on dimensions of the object at various view angles;
    sampling colors of a set of points in the selected portion of GUI by the client device;
    determining whether the object has been updated by a frame update based at least in part on the sampled colors of the set of points in the selected portion of the GUI.

2. The method of claim 1, further comprising:
    storing a timestamp of the frame update in response to determining that the object has been updated by the frame update; and
    computing a display performance metric based at least in part on the timestamp.

3. The method of claim 2, wherein computing the display performance metric is also based on timestamps of the one or more input events.

4. The method of claim 1, further comprising:
    matching individual frames to the one or more input events based on the sampled colors of the set of points in the selected portion of the GUI.

5. The method of claim 1, wherein determining whether the object has been updated by the frame update further comprises:
    determining whether a sampled color of a point corresponding to the background of the object is different from a previously sampled color of the point corresponding to the background of the object; and
    determining that the object has been updated by the frame update in response to determining that the sampled color of the point is different from the previously sampled color.

6. The method of claim 1, further comprising:
    determining a motion vector of the object by performing a majority vote computation on the sampled colors of the points.

7. The method of claim 1, wherein the GUI is rendered by a virtual desktop running on the server and wherein the sampling of the colors is executed by a performance monitoring module running on the client device.

8. A computer implemented method for measuring display performance of a remote application, comprising:
    receiving a sequence of input events from a client device to a server, wherein the sequence of input events cause the server to generate a sequence of frame updates to a GUI that is to be displayed on the client device;
    in response to the sequence of received input events, rendering an object in the GUI between successive frame updates using a color that corresponds to a position of the object in the GUI or a sequence number for the frame,
    wherein the color is selected from a color matrix based on a Cartesian coordinate of the object in the GUI, wherein the color matrix is a two dimensional color image where each coordinate encodes a unique color.

9. The method of claim 8, wherein rendering the object between successive frame updates further comprises:
    determining a color for a GUI object before generating the frame based on a lookup table or a color-encoding function.

10. A non-transitory computer readable storage medium storing instructions thereon, the instructions when executed by one or more processors, causing the one or more processors to execute a set of operations comprising:
    determining an object in a graphical user interface (GUI) rendered by a remote server and displayed on a client device based on display information transmitted from the remote server to the client device over a network, wherein the object is manipulated by the server in response to one or more input events, wherein the object is a three dimensional object that is animated by the remote server;
    selecting a portion of the GUI displayed on the client device that includes at least some background around the object, wherein the portion of the GUI that includes at least some background of the object is selected based on dimensions of the object at various view angles;
    sampling colors of a set of points in the selected portion of GUI by the client device;
    determining whether the object has been updated by a frame update based at least in part on the sampled colors of the set of points in the selected portion of the GUI.

11. The non-transitory computer readable storage medium of claim 10, further comprising instructions for:
    storing a timestamp of the frame update in response to determining that the object has been updated by the frame update; and
    computing a display performance metric based at least in part on the timestamp.

12. The non-transitory computer readable storage medium of claim 11, wherein computing the display performance metric is also based on timestamps of the one or more input events.

13. The non-transitory computer readable storage medium of claim 10, further comprising instructions for:
    matching individual frames to the one or more input events based on the sampled colors of the set of points in the selected portion of the GUI.

14. The non-transitory computer readable storage medium of claim 10, wherein determining whether the object has been updated by the frame update further comprises:
    determining whether a sampled color of a point corresponding to the background of the object is different from a previously sampled color of the point corresponding to the background of the object; and
    determining that the object has been updated by the frame update in response to determining that the sampled color of the point is different from the previously sampled color.

15. The non-transitory computer readable storage medium of claim 10, further comprising instructions for:
    determining a motion vector of the object by performing a majority vote computation on the sampled colors of the points.

16. The non-transitory computer readable storage medium of claim 10, wherein the GUI is rendered by a virtual desktop running on the server and wherein the sampling of the colors is executed by a performance monitoring module running on the client device.

\* \* \* \* \*